(12) United States Patent
Huo et al.

(10) Patent No.: US 7,706,440 B2
(45) Date of Patent: Apr. 27, 2010

(54) METHOD FOR REDUCING BIT RATE REQUIREMENTS FOR ENCODING MULTIMEDIA DATA

(75) Inventors: Yan Huo, Hong Kong (CN); Oscar Au, Kowloon (CN); Zhibin Lei, Taikoo Shing (HK)

(73) Assignee: Hong Kong Applied Science and Technology Research Institute Co., Ltd., Hong Kong (CN)

( * ) Notice: Subject to any disclaimer, the term of this patent is extended or adjusted under 35 U.S.C. 154(b) by 1480 days.

(21) Appl. No.: 11/053,362

(22) Filed: Feb. 8, 2005

(65) Prior Publication Data

US 2006/0176961 A1 Aug. 10, 2006

(51) Int. Cl.
*H04N 7/12* (2006.01)
*G06K 9/36* (2006.01)
(52) U.S. Cl. .................... 375/240.01; 382/248
(58) Field of Classification Search ............ 375/240.01, 375/240.16, 240.29, 240.02; 382/107, 168, 382/238, 248; 348/155
See application file for complete search history.

(56) References Cited

U.S. PATENT DOCUMENTS 5,452,377 A * 9/1995 Igarashi ............... 382/238
5,552,823 A * 9/1996 Kageyama ............ 348/155
6,002,796 A * 12/1999 Kawa et al. ........... 382/168
7,123,654 B2 * 10/2006 Song ................. 375/240.02
7,227,901 B2 * 6/2007 Joch et al. ........... 375/240.29
7,280,597 B2 * 10/2007 Zhang et al. .......... 375/240.16
2002/0015513 A1 * 2/2002 Ando et al. ............ 382/107

OTHER PUBLICATIONS

Cote, G. et al., "Recent Advances in Video Compression Standards", IEEE Canadian Review, Spring 2002, pp. 21-24.

* cited by examiner

*Primary Examiner*—Gims S Philippe
(74) *Attorney, Agent, or Firm*—Fulbright & Jaworski L.L.P.

(57) ABSTRACT

Some representative embodiments are directed to systems and methods for compressing a data set. In one embodiment, a method comprises receiving a frame of data to be encoded, generating a residual frame that represents a difference between the received frame and one or several reference frames, performing a respective sum of absolute differences (SAD) calculation for each block within the residual frame, and applying a transform function to each data value within the residual frame, wherein the transform function is at least a function of a SAD value calculated for the block containing the respective data value.

17 Claims, 2 Drawing Sheets

METHOD FOR REDUCING BIT RATE REQUIREMENTS FOR ENCODING MULTIMEDIA DATA

TECHNICAL FIELD

The present invention is generally directed to systems and methods for compressing data.

BACKGROUND

Multimedia data (video, audio, text, and combinations thereof) used by many applications presents a large degree of complexity. In many applications, such complexity is primarily addressed through data compression to achieve efficient processing, delivery, presentation, and other important functions involving the multimedia data.

Data compression algorithms rely upon the redundancy in a data set to obtain coding efficiency. In general, a priori knowledge of the characteristics of data sets are used to select coding algorithms for the data sets to achieve data compression. For example, image compression algorithms rely upon spatial correlation in image data. Specifically, it is known that the level of a respective pixel is closely related to the level of adjacent pixels. Likewise, a level of a pixel in a respective video frame is closely related to the level of the same pixel and/or adjacent pixels in a prior video frame. Accordingly, many image and video compression algorithms generate "residual" or "difference" signals that are encoded using run lengths and other techniques to take advantage of the spatial and/or temporal correlation. For example, the compression algorithms defined by the Motion Picture Expert's Group (MPEG) standards use these techniques.

The performance of a compression algorithm is dependent upon the choice of the reference mechanism or functionality used to generate the residual signal. In video compression algorithms, the selection of the reference frame occurs by assuming that a relatively restrictive temporal relationship exists. Following this assumption, the reference frame is typically selected by examining a limited number of previous frames from a frame being encoded. If the video data exhibits a relatively tight temporal correlation, compression performance is acceptable. However, multimedia data does not necessarily always follow such assumptions. Accordingly, known compression algorithms may not be able to effectively exploit the redundancy that exists in many multimedia data sets.

SUMMARY

Some representative embodiments are generally related to algorithms that compress a current data frame by calculating and encoding residual data using one or several reference frames of data. Furthermore, some representative embodiments enable a greater amount of compression to occur by generating optimal residual data. In some representative embodiments, the optimal residual data is a function of many factors, such as the current frame, one or several reference frames, sum of absolute differences (SAD) values, motion vector values, block energy, and/or other system variables. For example, a value in a traditional residual data block may be transformed or scaled by a function of a SAD value associated with that block. The transformed value is then used to encode the residual value for the particular data element. The transform function is preferably selected to differentiate between information that can be discarded (e.g., noise, artifacts, and/or the like) and information that is important to the perceived "quality" of data. By enabling such differentiation to occur, some representative embodiments enable a greater amount of data compression to occur.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
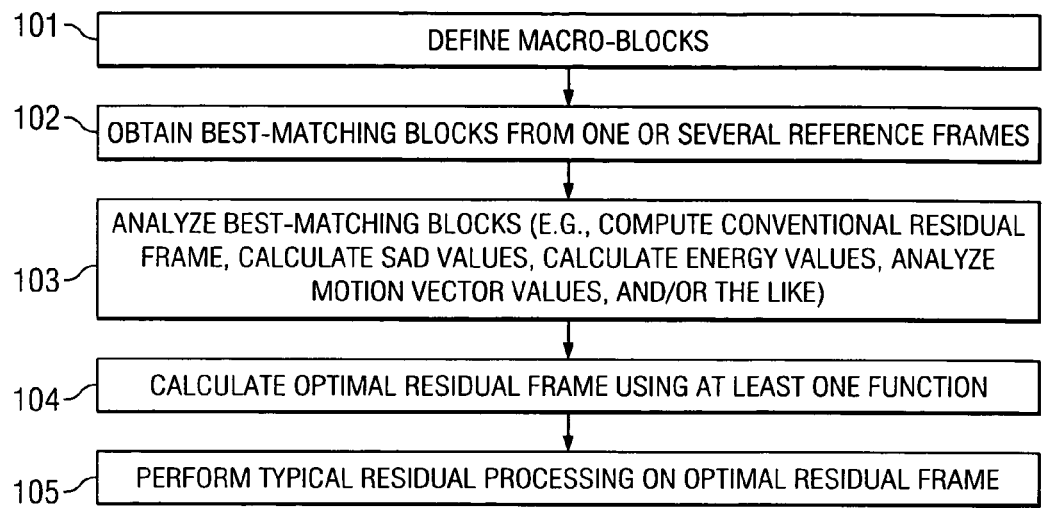
FIG. 1 depicts a flowchart for compressing a video frame according to one representative embodiment.

To illustrate compression of a video frame according to one representative embodiment, reference is made to FIG. 1. The process flow of FIG. 1 begins at step 101. In step 101, a set of non-overlapping macroblocks of pixels are defined. The macroblocks may be subdivided into subblocks of size 16×16, 16×8, 8×16, 8×8, 4×8, 4×4, and/or the like in the manner disclosed by multiple block-size motion estimation. The different patterns of subdivision may be applied to respective macroblocks. Also, the subdivision may vary on a frame by frame basis. Each macroblock may include more than one component or channel (e.g., RGB, YIQ, YUV, YCbCr, etc).

In step 102, for each block within the current frame, a best-matching block is obtained. Each best-matching block may be identified from a block of the same size in a reference frame. Alternatively, the best-matching block may originate from a larger block in a manner similar to overlapping motion estimation. Moreover, each best-matching block may be identified from a weighted linear combination of adjacent blocks in a manner similar to sub-pixel motion estimation or overlapping motion estimation/compensation algorithms. The weights applied to the multiple blocks to generate a best-matching block may vary on a pixel by pixel basis. Also, the best-matching block may be identified from a combination of previous frames within a predefined distance and subsequent frames with a predefined distance. In one embodiment, the search for best-matching blocks for the blocks within frame i may traverse frames i−2, i−1, i+1, i+2 and any blocks therein. The identification of the best-matching block may also use the current frame. Furthermore, a respective best-matching block may be formed using a repetition of selected pixels in a manner similar to extended motion estimation. As an example, steps 101 and 102 may be performed using standard video processing algorithms such as the algorithms defined in the various MPEG compression standards.

In step 103, for each block in the current frame, an analysis of its corresponding best matching block is performed. The analysis may involve calculation of a conventional residual frame. The analysis may also include performing a respective sum of absolute differences calculation for each residual block, determining the energy in each residual block, analyzing the motion vector associated with each residual block, examining the past frame history of such characteristics, and/or the like.

In step 104, an optimal residual frame is calculated as a function of one or several variables (e.g., optimal_residual=function_F(conventional_residual, one or several other parameters). In one embodiment, a transform function of the selected parameter(s) associated with each block of the conventional residual frame is employed. The transform function is evaluated for each data element in the conventional residual frame and each data element in the residual frame is scaled by the resulting value. After each data element has been scaled, the conventional residual frame has been converted into the optimal residual frame. Multiple functions may also be employed to generate a single optimal residual frame. The functions may be linear or non-linear.

Each function is selected to differentiate between signal information that is useful to the perceived quality of the data and signal information that is not important (such as errors, noise, artifacts, and/or the like). Also, the functions may take many forms and/or formats. For example, suppose the compression algorithm is applied to video taken according to a slow motion "drag" of the camera. A low complexity function can be applied. Alternatively, when a scene possesses more complex camera movements and object movements, a more complex function can be used to decide what information in the residual can be discarded (or equivalently what is the best residual frame that can be produced given computational, resource, and time constraints). The optimal reference frame differs from known residual frames in that the optimal reference frame does not encode all differences. Specifically, the application of the transform function(s) removes information that is not important to the perceived quality of the data. Accordingly, a greater amount of compression can be achieved.

In step 105, typical residual processing may occur such as application of the discrete cosine transform (DCT) or other transforms, quantization, entropy encoding (e.g., Huffman encoding, arithmetic encoding, etc.), association of motion vectors, and/or the like. The typical processing defined by the MPEG standards may be employed.

After compression, the data can be recovered using traditional processing. For example, conventional MPEG decoders may be used to recover the compressed data. Due to the application of the transform function(s), the exact video data of a particular frame might not be recovered (i.e., the compression is lossy). However, the transform functions are preferably selected such that erroneous or otherwise less important information is omitted from the residual data. Accordingly, the viewer of the decompressed video data does not experience an undue reduction in the image quality.

Although FIG. 1 describes compression of video data, the present invention is not so limited. Some representative embodiments may be employed upon any type of data that is amenable to lossy compression.

Figure 2:
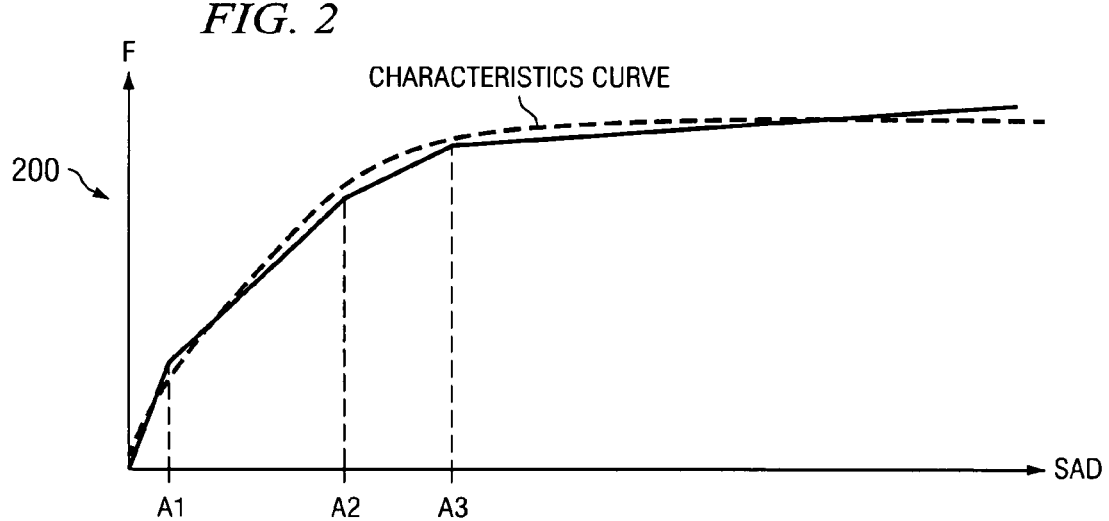
FIGS. 2-4 depict transform functions of SAD values used to scale residual values according to some representative embodiments.

FIG. 2 depicts function 200 that may be applied to residual data according to one representative embodiment. Function 200 is a piece-wise linear function of the SAD value. Function 200 is divided into several regions with each region having its own parameter value (in the simplified linear case, the slope of the line). For small SAD values, the line can be steep so that the optimal residual data is reduced (to reflect the fact that the difference may be noise or an error). Alternatively, for larger SAD values, the line becomes flat so that the full residual value can be encoded. The regions can be obtained via training or previous statistics.

Figure 3:
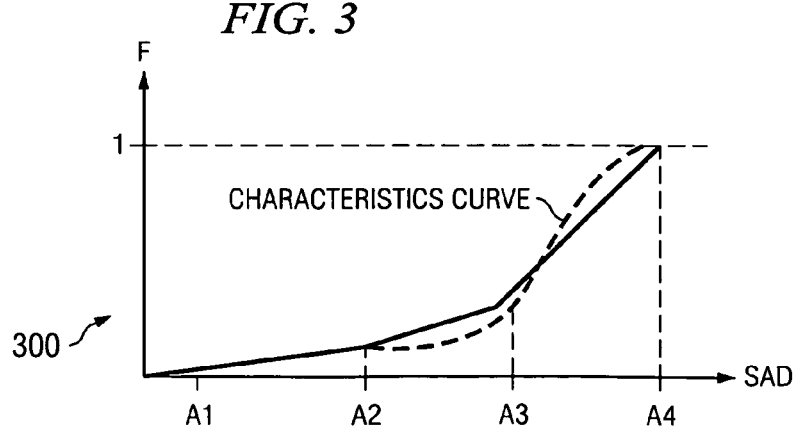
Figure 4:
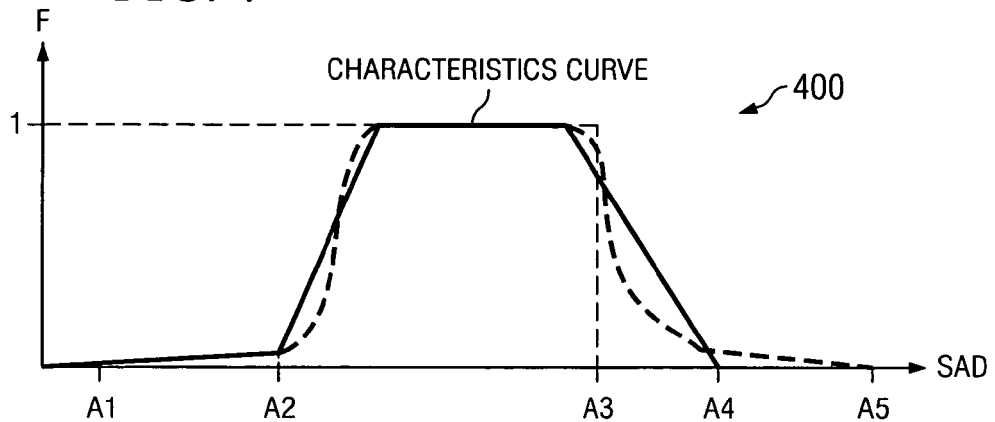

FIGS. 3 and 4 depict functions 300 and 400 respectively according to other representative embodiments. Function 300 suppresses differences associated with small SAD values while emphasizing differences associated with larger SAD values (e.g., "important" new video features). Function 400 possesses a "bandpass" shape. Differences associated with small and large SAD values are suppressed. Function 400 may be applied when prior knowledge indicates that large difference values may be unreliable and, hence, should be suppressed. In other embodiments, the transform functions may similarly be functions of energy, entropy, and/or motion vectors.

Figure 5:
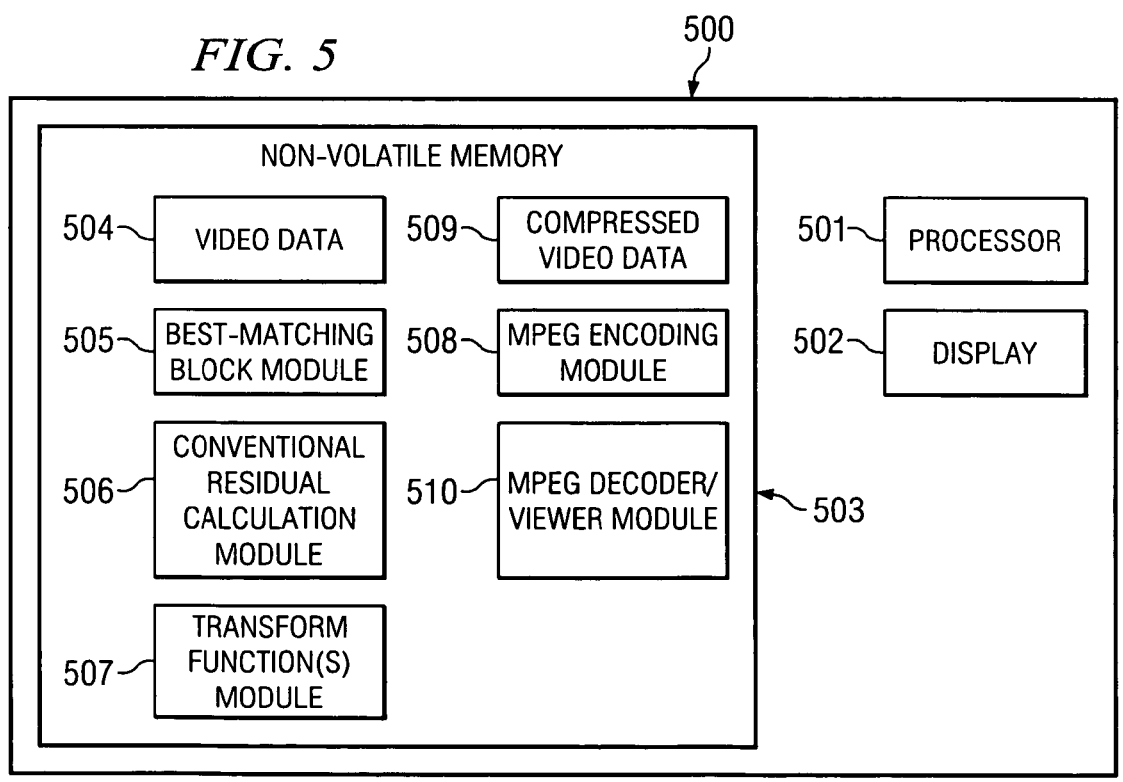
FIG. 5 depicts a system that performs data compression according to one representative embodiment.

FIG. 5 depicts system 500 that compresses video data according to one representative embodiment. System 500 may be implemented using a computer platform that includes suitable computing resources such as processor 501, display 502, and non-volatile memory 503. Non-volatile memory 503 may be used to store code or software instructions that perform the compression of video data 504. For example, a current video frame may be processed by best-matching block module 505. After the identification of best matching blocks for a current frame of data from one or several reference frames, conventional residual calculation module 506 generates a residual frame. Transform function(s) module 507 uses one or several variables to scale the data values of the conventional residual frame to generate an optimal residual frame. The variables may include SAD values, energy values, motion vector values, and/or the like. Transform function module(s) 507 removes information from the residual frame that is not important to image quality or that may represent noise or errors. The optimal residual frame is processed by MPEG encoding module 508 to generate compressed video data 509. Compressed video data 509 can be accessed using conventional MPEG decoder/viewer module 510.

Although MPEG encoding has been discussed for some representative embodiments, any suitable encoding scheme may be employed according to other representative embodiments. Additionally, although some representative embodiments may been described in terms of software, other suitable logic elements could be employed such as integrated circuitry.

Although the present invention and its advantages have been described in detail, it should be understood that various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method, comprising:
   receiving a frame of data to be encoded;
   generating a residual frame that represents a difference between said received frame and one or several reference frames;
   performing a respective sum of absolute differences (SAD) calculation for each block within said residual frame; and
   applying a transform function to each data value within said residual frame, wherein said transform function is at least a function of a SAD value calculated for the block containing the respective data value.

2. The method of claim 1 wherein said transform function is a piece-wise function.

3. The method of claim 2 wherein said transform function is a linear function having different slopes for respective regions of SAD values.

4. The method of claim 1 wherein said transform function possesses a relatively steep slop for lower SAD values and a relatively flat slope for higher SAD values.

5. The method of claim 1 wherein said transform function is a function of a motion vector associated with the block containing the respective data value.

6. The method of claim 1 wherein said transform function is a function of calculated energy associated with the block containing the respective data value.

7. The method of claim 1 further comprising:
   encoding said residual frame after application of said transform function.

8. The method of claim 1 wherein said frame of data is a frame of a video sequence.

9. A system for compressing video data, comprising:
   means for receiving a frame of data to be encoded;
   means for generating a residual frame from said received frame and one or several reference frames;
   means for calculating a respective metric for each block of said residual frame, wherein said metric is indicative of a difference between a block of said received frame and a corresponding block in said residual frame; and
   means for scaling each data element of said residual frame using a transform function, wherein the calculated metric associated with the residual block containing a respective data element is provided to said transform function as a function argument.

10. The system of claim 9 wherein said metric is a sum of absolute differences metric.

11. The system of claim 9 wherein said transform function is a piece-wise function.

12. The system of claim 11 wherein said transform function is a linear function having different slopes for respective regions of sum of absolute differences (SAD) values.

13. The system of claim 12 wherein said transform function possesses a relatively steep slope for lower SAD values and a relatively flat slope for higher SAD values.

14. The system of claim 9 wherein said transform function is a function of a motion vector associated with the block containing the respective data element.

15. The system of claim 9 wherein said transform function is a function of calculated energy associated with the block containing the respective data element.

16. The method of claim 9 further comprising:
   means for encoding said residual frame after operation of said means for scaling.

17. The method of claim 9 wherein said frame of data is frame of a video sequence.

* * * * *